United States Patent Office 3,440,394
Patented Apr. 22, 1969

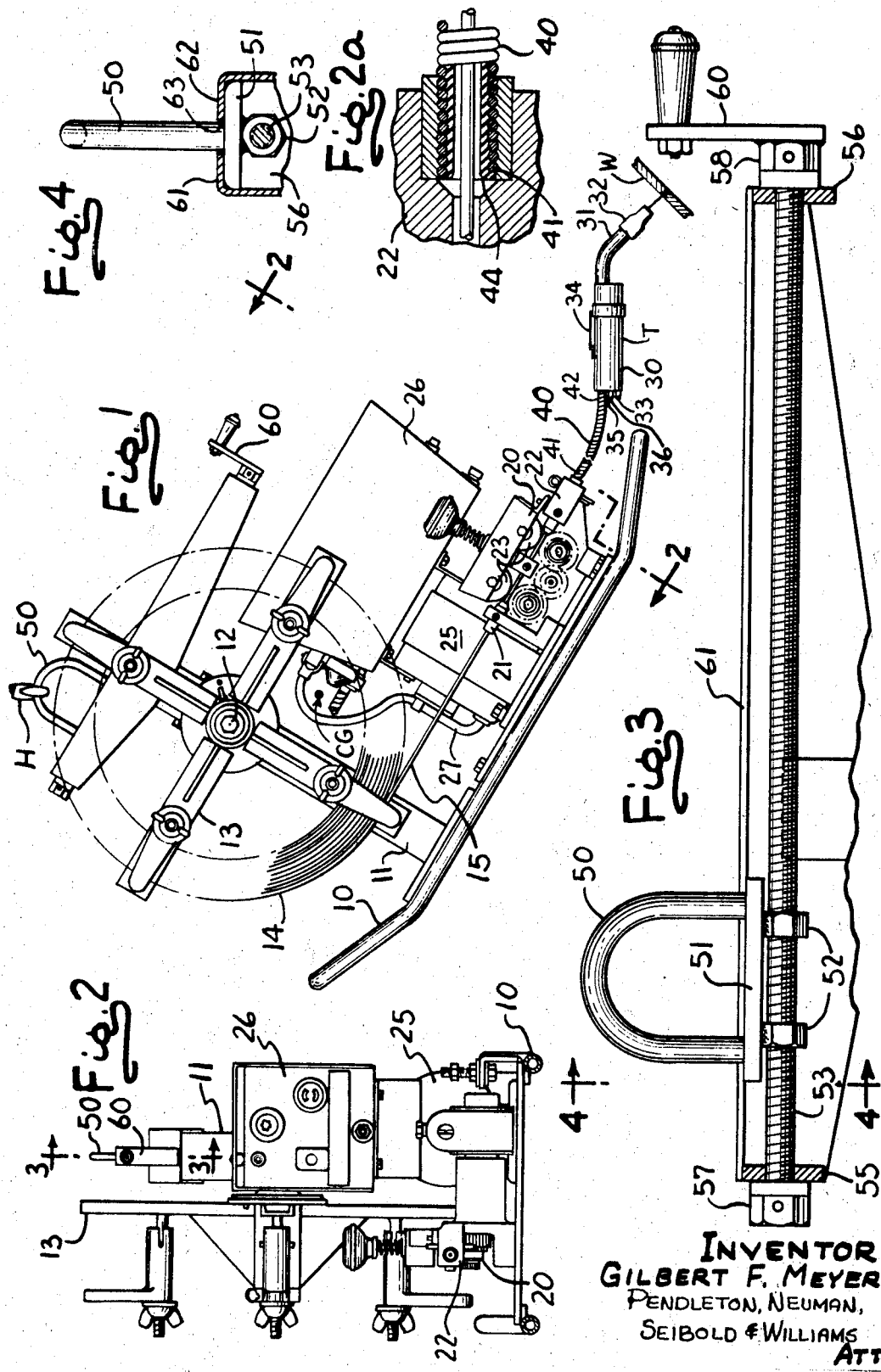

3,440,394
ELECTRIC WELDING ASSEMBLY
Gilbert F. Meyer, Milwaukee, Wis., assignor to Machinery and Welder Corporation, Skokie, Ill., a corporation of Missouri
Filed Oct. 11, 1965, Ser. No. 494,486
Int. Cl. B23k 9/00, 9/12
U.S. Cl. 219—130                6 Claims

ABSTRACT OF THE DISCLOSURE

An electric welding assembly includes a frame having a reel mounted thereon for feeding welding wire in a continuous length to a torch. A drive system is mounted on the frame and a semi-flexible wire conduit is connected at one end to the drive system and is connected at its other end to the torch. A suspension eye is secured to the frame and engages a hook for pivotally maintaining the frame in an elevated position. A means is attached to the suspension eye for changing the longitudinal position of eye with respect to the frame to adjust the frame in the elevated position and to maintain the frame in the elevated position as the welding wire is fed to the torch to compensate for a shift in the center of gravity of the assembly so that bending of the semi-flexible conduit is minimized.

---

The present invention relates to an electric welding assembly including novel means for providing physical support.

It is an object of the present invention to provide an electric welding assembly having a semi-flexible conduit for feeding a continuous length of wire to the welding torch and which includes novel provision for minimizing the bending of the conduit necessary for proper positioning of the torch with respect to the work. It is, therefore, an object of the invention to provide a novel suspension means for a continuous feed welding assembly which minimizes the force required to hold the torch to the work, thus reducing fatigue, and which simultaneously minimizes the frictional drag, and particularly changes in the amount of frictional drag, between the welding wire and its conduit making possible the feeding of the wire at a more constant and controlled rate. It is a further object of the invention to provide a novel suspension means for a continuous feed electric welding assembly which permits periodic or constant adjustment in order to compensate for a change in the weight of the reel as the wire is gradually consumed. Since the conduit need not be formed in either a simple or compound curve but may be used in substantially straight condition, it is possible for the conduit to be considerably shorter than would be required in a more conventional set-up.

Other objects and advantages of the invention will become apparent upon reading the attached detailed description and upon reference to the drawings in which:

FIGURE 1 is a side view of an electric welding assembly incorporating the present invention;

FIG. 2 is an end view of the welding assembly looking along the line 2—2 in FIG. 1;

FIG. 2a is a fragmentary section showing the anchoring of the conduit at the outlet of the drive unit;

FIG. 3 is a fragmentary longitudinal section showing the adjusting screw and taken along the line 3—3 in FIG. 2;

FIG. 4 is a cross section showing the suspension eye and taken along the line 4—4 in FIG. 3.

While the invention has been described in connection with a preferred embodiment, it will be understood that I do not intend to be limited to the particular embodiment shown but intend to cover the various alternate and equivalent constructions included within the spirit and scope of the appended claims.

Turning now to the drawing, there is shown a welding assembly having a frame 10 which includes a post or upright 11 having a spindle 12 mounting a wire reel 13. For a discussion of the reel structure, reference is made to my copending application, Ser. No. 494,487, filed Oct. 11, 1965, and it will suffice for the present to say that the reel holds a spool of bare welding wire 14 formed in a continuous length and having a lead portion 15.

For the purpose of drawing the wire from the reel and feeding it to the welding torch, a drive roller assembly 20 is provided having an inlet 21 and an outlet 22 in alinement therewith. Interposed between the inlet and outlet are a plurality of drive rollers 23. For rotating the drive rollers for propelling the wire, a drive motor 25 is provided, suitable gearing (not shown) being interposed between the motor shaft and the drive rollers so that the wire is driven from the outlet at a convenient speed. Such speed may be on the order of 1–10 inches per second. For the purpose of insuring that the speed of the motor and consequently the speed of the wire is maintained within close limits, a motor control unit 26 is provided having a housing which may be secured to the motor as shown and which is connected to the motor by cable 27. The details of the control unit 26 are outside of the scope of the present invention and it will be sufficient to say that the control unit is capable of maintaining the speed of the wire substantially constant in spite of the factors which might tend to vary the loading imposed upon the motor and which might therefore have an effect upon the motor speed.

In carrying out the present invention a semi-flexible wire conduit is provided between the outlet of the drive unit 20 and the torch, permitting the torch, indicated at T, to be held in the hand of the operator at a convenient angle and spacing with respect to the workpiece W. The details of the structure and function of the torch are set forth in some detail in my copending application Ser. No. 325,079, filed Nov. 20, 1963. It will suffice to say that the torch not only feeds the wire to an arc established at the work but is connected to a source of inert gas so that the arc is constantly surrounded by a gaseous atmosphere which prevents oxygen from affecting the quality of the weld. The torch is distinguished by a cylindrical body 30 having a gooseneck 31 terminating a gas cup 32, the gas being fed to the torch via a line 33. For the purpose of stopping and starting the movement of the wire a switch is embodied in the torch having a switch operator 34 which extends longitudinally along the the body of the torch and with the switch being connected to the motor control unit 26 via a switch line 35. A cable 36 connects the torch to the source of welding current.

In accordance with the present invention a suspension eye is provided at the top of the supporting frame for holding the frame in an elevated position above the floor with means for longitudinally positioning the suspension eye with respect to the center of gravity of the assembly so that the frame assumes an angled position, minimizing bending of the wire conduit 40 from its region of anchoring 41 to the torch when the torch is held in a convenient working position. Thus, referring to the drawing, I provide a suspension eye 50 which is engaged by an overhead hook H which may form part of a small utility hoist. For longitudinal adjustment the eye is secured to a plate 51 which is in turn mounted on a traveling nut 52 threadedly engaging a longitudinally extending screw 53. The screw is mounted at its ends in supports 55, 56 which are secured to the frame, with the screw being held captive in the supports by collars or nuts 57, 58 which are fixed, as by pinning, at its respective ends. For rotating the screw, a crank 60 is conveniently provided at one end.

In order to shield and protect the screw and traveling nut, while permitting clearance for the eye in all of its positions of adjustment, a housing is provided made up of opposed halves 61, 62 (see FIG. 4) defining a centrally extending slot 63. The plate 51 to which the eye is secured rides flatly along the underside of the housing and this, combined with the narrow width of the slot 63, insures that the eye is maintained in its upright, fully extended position.

With the above construction in mind, the features and advantages of the invention will become apparent to one skilled in this art. For the most convenient and efficient position of the torch T there will be an angular position of the frame which produces a minimum amount of curvature in the semi-flexible conduit 40. It is a simple matter for the operator to turn the crank 60, thereby moving the eye 50 along the screw until the most suitable orientation of the frame is found for the work to be done. The screw extends substantially the length of the assembly so that a large variation in angle, in both directions from the horizontal, is available to accommodate both "high" and "low" work. Since the center of gravity of the entire assembly, indicated at CG, is dependent upon the amount of wire remaining on the reel, and since the adjustment is a progressive one, making a touch-up adjustment from time to time to compensate for the lost weight is a simple matter.

By orienting the assembly to produce minimum curvature in the conduit, the force required to hold the torch in its desired position is minimized. As pointed out, the conduit, in effect, consists of a continuous helical spring which has substantial inherent restoring force whenever it is substantially curved. By using the invention it is not necessary for the operator to counteract any substantial amount of restoring force so that the torch may be held comfortably for hours at a time, even when the wire and conduit are of heavy gauge. Moreover, a much shorter conduit may be used than is required in conventional setups where the conduit must be capable of leading into a compound curve. Minimizing the curvature and length of the conduit not only reduces the scuffing which occurs between the wire and the inside surface of the conduit but also minimizes the loading upon the motor and, more particularly, the sharp variations in loading which may occur when the curvature is constantly changed. This, in turn, makes it possible for the speed of the wire to be maintained more constant than would be the case if the motor control means were constantly called upon to compensate for wide swings in the motor load.

While the invention is particularly applicable to suspending the welding assembly at an angle for accommodation of a particular torch position, the invention is also useful where it is desired to maintain the welding assembly suspended horizontally in spite of the shifts in the center of gravity which occur as the wire on the reel is gradually consumed. Thus it will be apparent that where the reel is located to one side of the center of gravity with a full load of wire, as this wire is consumed, the center of gravity shifts and the eye may be easily shifted to compensate and thereby bring the frame back to its horizontal position.

In the following claims the term "longitudinal" will be understood to refer to the direction of movement of the wire as it passes from the reel through the drive unit. The term "eye" is not necessarily limited to the particular form which is shown in the drawing but the term is intended generically to cover any shiftable point of attachment provided for suspension purposes.

I claim:

1. In an electric welding assembly the combination comprising a frame, means including a reel on the frame for feeding of welding wire in a continuous length, a drive motor on the frame, a drive roller assembly coupled to the motor and having a longitudinally oriented outlet, a semi-flexible wire conduit having one end anchored in alinement with the wire at the outlet, a hand torch connected to the opposite end of the conduit for feeding wire to the work, a means for pivotally mounting the frame in an elevated position, a suspension eye attached to the top of the frame for holding the frame in elevated position above the floor, said suspension eye engaging said means, and means for changing the longitudinal position of the eye with respect to the frame to compensate for a shift in the center of gravity of the assembly for maintaining the frame in angled position whereby bending of the conduit from its region of anchoring to the torch positioned at the work is minimized.

2. In an electrical welding assembly the combination comprising a frame, means including a reel on the frame for feeding of welding wire in a continuous length, a drive motor on the frame, a drive roller assembly coupled to the drive motor and having a longitudinally orientated outlet, a semi-flexible wire conduit having one end anchored in alinement with the welding wire at the outlet, a hand torch connected to the opposite end of the conduit for feeding the wire to the work, a means for pivotally mounting the frame in an elevated position, a longitudinally extending screw rotatably mounted in the upper portion of the frame, a traveling nut on the screw, a suspension eye secured to the nut, said suspension eye engaging said means, and means for rotating the screw thereby to change the longitudinal position of the suspension eye with respect to the frame to compensate for a shift in the center of gravity of the assembly for maintaining the frame in an angular position whereby bending of the conduit from its region of anchoring to the torch positioned at the work is minimized.

3. In an electrical welding assembly the combination comprising a frame, means including a reel on the frame for feeding of welding wire in a continuous length, a drive motor on the frame, a drive roller assembly coupled to the motor and having a longitudinally orientated outlet, a semi-flexible wire conduit having one end anchored in alinement with the wire at the outlet, a hand torch connected to the opposite end of the conduit for feeding the wire to the work, a means for pivotally mounting the frame in an elevated position, a rotatable screw extending longitudinally in the upper portion of the frame and captive therein, a traveling nut on the screw, a suspension eye on the nut for suspending the frame in elevated position above the floor, said suspension eye engaging said means, said screw having means at one end for manually rotating the same thereby to adjust the longitudinal position of the eye with respect to the frame to compensate for a shift in the center of gravity of the assembly for maintaining the frame in angular position whereby bending of the conduit from its region of anchoring to the torch positioned at the work is minimized, said frame including a longitudinally extending screw enclosure for protectively surrounding the screw, said screw enclosure having a longitudinal slot extending the length thereof just sufficient to clear the eye as the same is moved along its path of adjustment.

4. In an electric welding assembly the combination comprising a frame, means including a reel on the frame for feeding of welding wire in a continuous length, a drive motor on the frame, a drive motor assembly coupled to the drive motor and having a longitudinally oriented outlet, a semi-flexible wire conduit having one end anchored in alinement with the wire at the outlet, a hand torch connected to the opposite end of the conduit for feeding wire to the work, a means for pivotally mounting the frame in an elevated position, the reel axis being displaced from the center of gravity of the assembly, a suspension eye attached to the top of the frame for holding the frame in elevated position above the floor, said suspension eye engaging said means, and means including a screw for longitudinally positioning the eye with respect to the frame to compensate for a shift in the center of gravity of the assembly and permit adjustment of the orientation of the welding assembly as the wire on the reel is gradually consumed.

5. In an electrical welding assembly the combination comprising a frame, means including a reel on the frame for feeding of welding wire in a continuous length and having a longitudinally orientated outlet, a semi-flexible wire conduit having one end anchored in alinement with the welding wire at the outlet, a hand torch connected to the opposite end of the conduit for feeding the wire to the work, a means for pivotally mounting the frame in an elevated position, a longitudinally extending screw rotatably mounted in the upper portion of the frame, a traveling nut on the screw, a suspension eye secured to the nut, said suspension eye engaging said means, means for rotating the screw thereby to change the longitudinal position of the suspension eye with respect to the frame to compensate for a shift in the center of gravity of the assembly for maintaining the frame in an angular position whereby bending of the conduit from its region of anchoring to the torch positioned at the work is minimized, and means including drive rollers for driving the wire through the conduit.

6. In an electrical welding assembly the combination comprising a frame, means including a reel on the frame for feeding of welding wire in a continuous length and having a longitudinally oriented outlet, a semi-flexible wire conduit having one end anchored in alinement with the welding wire at the outlet, a torch connected to the opposite end of the conduit for feeding the wire to the work, a means for pivotally mounting the frame in an elevated position, a longitudinally extending shaft mounted in the upper portion of the frame, a suspension eye mounted on the shaft, said suspension eye engaging said means, and means for adjustably shifting the suspension eye along the shaft and for holding the same in its adjusted position thereby to change the position of the eye with respect to the frame to compensate for a shift in the center of gravity of the assembly for maintaining the frame in an angular position whereby bending of the conduit from its region of anchoring to the torch positioned at the work is minimized, and means including drive rollers for driving the wire through the conduit.

References Cited

UNITED STATES PATENTS

| | | | |
|---|---|---|---|
| 1,550,651 | 8/1925 | Charter | 219—124 |
| 1,853,609 | 4/1932 | Goodspeed | 219—125 |
| 2,344,534 | 3/1944 | Bucknam et al. | 219—124 X |
| 2,510,083 | 6/1950 | Davis et al. | 219—126 X |
| 3,104,313 | 9/1963 | Rieppel et al. | 219—124 |

RICHARD M. WOOD, *Primary Examiner.*

J. G. SMITH, *Assistant Examiner.*

UNITED STATES PATENT OFFICE
CERTIFICATE OF CORRECTION

Patent No. 3,440,394                                             April 22, 1969

Gilbert F. Meyer

It is certified that error appears in the above identified patent and that said Letters Patent are hereby corrected as shown below:

Column 2, after line 54, insert the following paragraph:

The wire conduit, indicated at 40, which interconnects the drive unit 20 and the torch, is of hollow construction, being conveniently formed of a continuous helix of stiff wire. The inlet end 41 of the conduit is anchored to the outlet 22 of the drive unit with the conduit held in alinement with the direction of the driven wire (see Fig. 2a). The opposite end 42 of the conduit is anchored to the body of the torch. It will be understood that the rollers and guides in the drive unit are insulated to avoid grounding of the welding wire and that the conduit has an insulating core as indicated at 44.

Signed and sealed this 14th day of April 1970.

(SEAL)
Attest:

EDWARD M. FLETCHER, JR.                          WILLIAM E. SCHUYLER, JR.
Attesting Officer                                        Commissioner of Patents